(12) United States Patent
Ditzman et al.

(10) Patent No.: US 8,261,064 B2
(45) Date of Patent: Sep. 4, 2012

(54) INTEGRATED SECURE AND NON-SECURE DISPLAY FOR A HANDHELD COMMUNICATIONS DEVICE

(75) Inventors: Todd E. Ditzman, Vincentown, NJ (US); Michael J. Paparo, Lafayette Hill, PA (US)

(73) Assignee: L-3 Communications Corporation, New York, NY (US)

( * ) Notice: Subject to any disclaimer, the term of this patent is extended or adjusted under 35 U.S.C. 154(b) by 611 days.

(21) Appl. No.: 11/679,553

(22) Filed: Feb. 27, 2007

(65) Prior Publication Data

US 2008/0209212 A1 Aug. 28, 2008

(51) Int. Cl.
*H04L 29/06* (2006.01)
(52) U.S. Cl. ........ 713/164; 713/167; 455/410; 455/411; 345/1.1; 345/156; 345/501; 178/18.01
(58) Field of Classification Search .................. 715/702; 345/1.1–1.2, 156–184, 501–522; 455/410, 455/411; 713/164, 167; 178/18.01–20.04
See application file for complete search history.

(56) References Cited

U.S. PATENT DOCUMENTS

| | | | | |
|---|---|---|---|---|
| 5,970,146 | A * | 10/1999 | McCall et al. ................ | 713/194 |
| 6,567,092 | B1 * | 5/2003 | Bowen .......................... | 345/506 |
| 6,630,928 | B1 * | 10/2003 | McIntyre et al. ............. | 345/173 |
| 6,715,078 | B1 | 3/2004 | Chaski | |
| 7,007,025 | B1 * | 2/2006 | Nason et al. .......................... | 1/1 |
| 2004/0024710 | A1 | 2/2004 | Fernando | |
| 2004/0212547 | A1 * | 10/2004 | Adamski et al. ............... | 345/1.1 |
| 2007/0223689 | A1 * | 9/2007 | O'Brien et al. ................. | 380/30 |

FOREIGN PATENT DOCUMENTS

| EP | 1355218 A | 10/2003 |
|---|---|---|
| EP | 1526426 A | 4/2005 |

OTHER PUBLICATIONS

"Microsoft Computer Dictionary 5$^{th}$ Edition", 2002, Microsoft Corporation, 5$^{th}$ edition, pp. 112 & 520.*

* cited by examiner

*Primary Examiner* — Jeffrey D Popham
*Assistant Examiner* — Daniel Potratz
(74) *Attorney, Agent, or Firm* — Condo Roccia LLP (57) ABSTRACT

A handheld communications device is created with a touch sensitive display, a secure computing component, and a non-secure computing component. The secure component may comprise a secure CPU executing a secure operating system. The non-secure component may comprise a separate non-secure CPU executing a separate non-secure operating system. The touch sensitive display on the handheld communications device is divided into a secure portion and a non-secure portion such that information displayed in the secure portion is provided by the secure operating system, and information displayed in the non-secure portion is provided by the non-secure operating system. Similarly, data entered through the secure portion of the display is provided to the secure operating system, and data entered through the non-secure portion of the display is provided to the non-secure operating system.

18 Claims, 5 Drawing Sheets

INTEGRATED SECURE AND NON-SECURE DISPLAY FOR A HANDHELD COMMUNICATIONS DEVICE

FIELD OF THE INVENTION

This invention is related to the field of secure computing; more specifically this invention is related to the field of secure computing on handheld communications devices.

BACKGROUND OF THE INVENTION

Data security is an important goal for a wide variety of industries. For corporations, this data may contain sensitive customer information. For the government, this data may contain military secrets. Typical methods for protecting this data include secure systems. An example of a secure system is a computer that has been put through some type of certification process or inspection that provides a reasonable assurance that any data entered into, or received from this particular computer is protected from access by unauthorized users, and can be considered secure.

Because of additional costs and overhead associated with using a secure system, users often split their work between secure and non-secure systems. For example, a user may use the secure computer when sending intra-company emails, but may prefer to use the non-secure computer to send personal emails or use the internet because the secure system may use a specialized operating system that may not support all of the applications available for the non-secure system. Further, an employer may wish to ensure the integrity of the secure system by limiting the use of the secure system to highly sensitive data only.

While keeping separate secure and non-secure computer systems is acceptable for desktop computers in office environments where space and weight are not concerns, it is generally unacceptable for handheld or mobile computer users. A user of a handheld computer may be unwilling to carry separate secure and non-secure handheld computers.

Therefore what is needed is a way to combine a secure and non-secure system on a single handheld communications device.

SUMMARY OF THE INVENTION

A handheld communications device is created with a secure computing component and a non-secure computing component. The secure component may comprise a secure CPU executing a secure operating system. The non-secure component may comprise a separate non-secure CPU executing a separate non-secure operating system. The secure and non-secure components share a common input and output system within the handheld communications device, such as a keyboard and display, for example.

A touch sensitive display on the handheld communications device is divided into a secure portion and a non-secure portion such that information displayed in the secure portion is provided by the secure operating system, and information displayed in the non-secure portion is provided by the non-secure operating system. Similarly, data entered through the secure portion of the display is provided to the secure operating system, and data entered through the non-secure portion of the display is provided to the non-secure operating system.

When an input is received via the touch sensitive display it is routed to a component in the secure component of the handheld communications device. Based on coordinates associated with the input, the component determines if the input was made in the secure or non-secure portion of the display. If the component determines the input was made in the secure portion of the display, then the input is routed to the secure operating system. If the component determines that the input was made in the non-secure portion of the display, then the input is routed into the non-secure operating system. By determining if inputs are directed to the non-secure or secure portion of the display in the secure component of the handheld communications device, the integrity of the data is preserved because no inputted data is provided to the non-secure component of the device until it is determined in the secure component of the device which portion of the display received the data.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
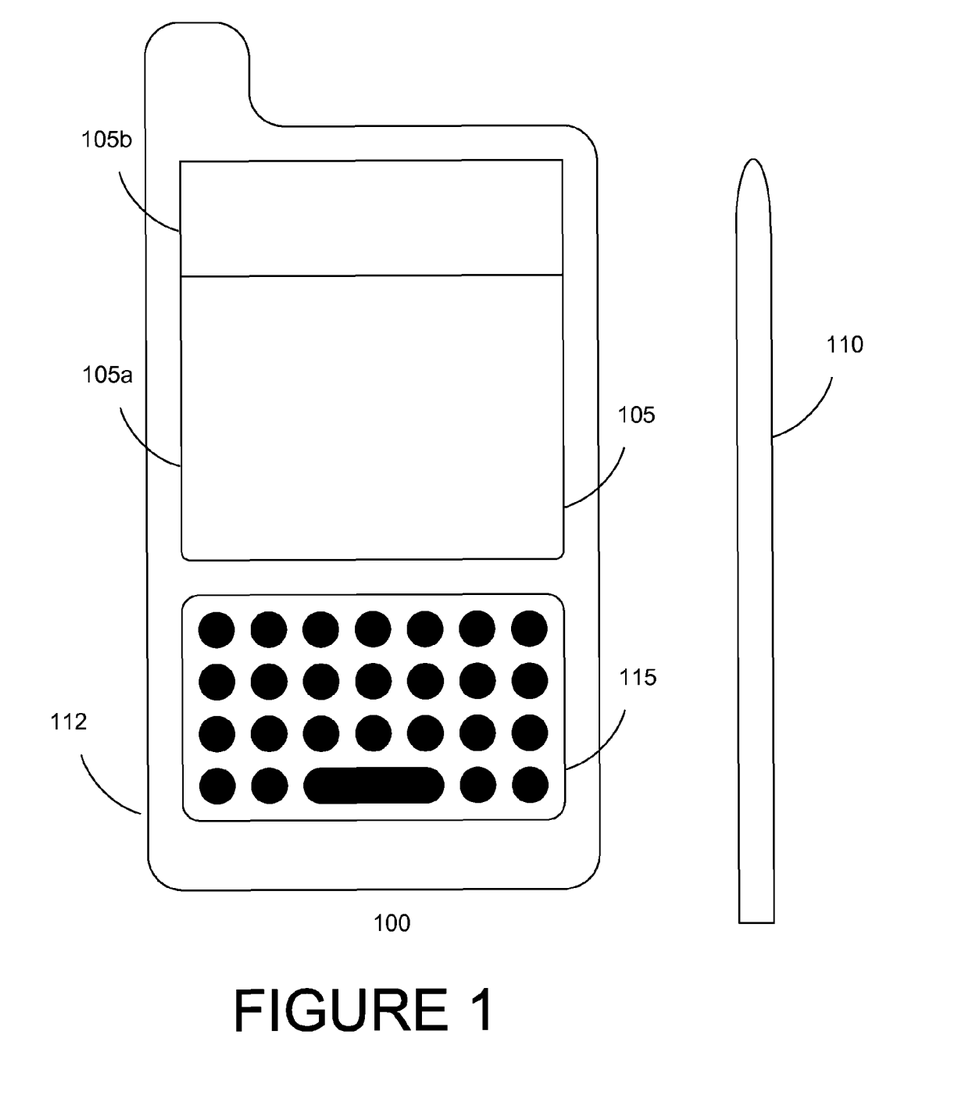
FIG. 1 is an illustration of an exemplary handheld communications device 100 with an integrated secure and non-secure display in accordance with the present invention.

FIG. 1 is an illustration of an exemplary handheld communications device 100 with an integrated secure and non-secure display in accordance with the present invention. The handheld communications device includes a housing 112, a keyboard 115, and a display 105. The display 105 may include a touch sensitive overlay, allowing the handheld communications device 100 to receive input made directly on the display though a stylus 110, for example. The display 105 can comprise any one of many commercially available displays, such as the SHARP®LQ030B7DD01, for example.

The handheld communications device 100 includes separate secure and non-secure processing components (not shown) within the housing 112. The processing of secure and non-secure data is separated between the secure and non-secure components to allow a user to view and input both secure and non-secure data on a single device. The hardware of the handheld communications device 100 is configured such that all processing of secure display data is handled only by the secure processing component. Similarly, the hardware is configured such that all processing of non-secure display data is handled only by the non-secure processing component. Further, the determination of whether a particular piece of data is secure or non-secure is first made in the secure processing component. The secure and non-secure hardware components are described further with respect to FIG. 2.

The display 105 is similarly bifurcated into two sections, a non-secure section 105a and a secure section 105b. The non-secure section 105a displays and receives (through the touch sensitive overlay) data and inputs for the non-secure processing component. Similarly, the secure section 105b displays and receives data and inputs for the secure processing component. In one embodiment, the secure section 105b comprises the top 38 rows of pixels. However, the actual location and size of both the secure section 105b and the non-secure section 105a is an arbitrary design choice.

The housing 112 is configured to preserve the integrity of at least the secure processing component and the display 105. This configuration may include making the housing 112 extremely difficult to disassemble once assembled, or deactivating the processing components once tampering has been detected. The housing 112 may be implemented using any number of known techniques for handheld device construction and security.

Figure 2:
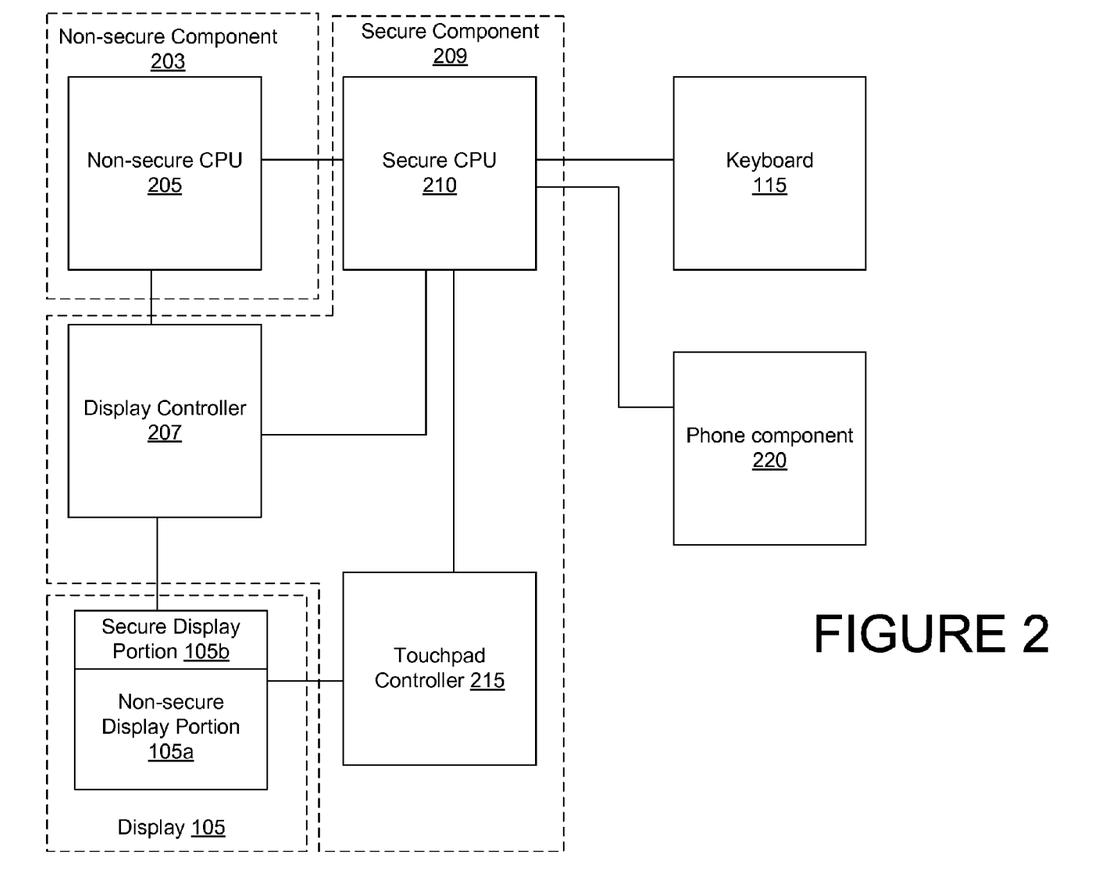
FIG. 2 is an illustration of an exemplary system 200 capable of the processing and display of both secure and non-secure data.

FIG. 2 is an illustration of an exemplary handheld communication system 200 capable of displaying and processing secure and non-secure data in accordance with the present invention. As shown, the system includes a secure component 209 and a non-secure component 203. The system further includes a display controller 207 that drives a display 105, a keyboard 115 for receiving character input from a user, and a phone component 220 for sending and receiving data.

The secure component 209 comprises a secure CPU 210, a touchpad controller 215, and a display controller 207. The secure CPU 210 executes a secure operating system. The secure operating system is an operating system that has met some set of standards or certification process that deems it to be secure. For example, a secure operating system may have shown to be impervious to certain known techniques employed by hackers. The particular standards that the secure operating system is judged by may be different depending on the particular field that the handheld device will be utilized. For example, what standards judge a secure operating system for a law firm may be different than what standards are used for the Government. Any standard for secure computing known in the art may be used.

The touchpad controller 215 receives input made to the display 105. As described above, the display 105 comprises two portions, a secure display portion 105b and a non-secure display portion 105a. When the touchpad controller 215 receives a user input from the touch screen which is mounted on display 105, it forwards the input which consists of the set of coordinates that identifies where on the display the input was received, to the secure CPU 210. The secure CPU 210 receives the input from the touchpad controller 215 and uses associated coordinates to determine which portion of the display 105 the input was received.

The secure CPU 210 determines which portion of the display 105 the input was received in by comparing the received coordinates with stored coordinates describing the boundaries of at least one of the secure display portion 105b and non-secure display portion 105a. The stored coordinates are stored in memory within the secure component 209. By storing the coordinates in the secure component 209, the authenticity of those coordinates can be maintained.

If the secure CPU 210 determines that the input was received in the non-secure display portion 105a, any data associated with the input is forwarded into the non-secure component 203 for processing. The non-secure component 203 comprises the non-secure CPU 205. If the secure CPU 210 determines that input was received in the secure portion of the display, then the data is kept in the secure component 209 for processing by the display controller 207.

The non-secure CPU 205 may comprise one or more CPUs. In one embodiment the non-secure CPU 205 comprises an Intel PXA270 Processor. However, any commercially available CPU may be used.

The non-secure CPU 205 may execute one or more non-secure operating systems. In one embodiment the non-secure operating system comprises Windows CE®; however any suitable operating system known in the art may be used.

The non-secure CPU 205 and the secure CPU 210 route their respective display data to the display controller 207. The display controller 207 takes the received data and directs it to the correct inputs of the display 105, such that the data received from the secure CPU 210 is displayed in the secure display portion 105b and the data received from the non-secure CPU 205 is displayed in the non-secure display portion 205a. In addition, the display controller 207 may optionally alter or transform the display data from the secure CPU 210 by adjusting the color depth. A technique for adjusting the color depth is described further with respect to FIG. 4, for example.

Figure 3:
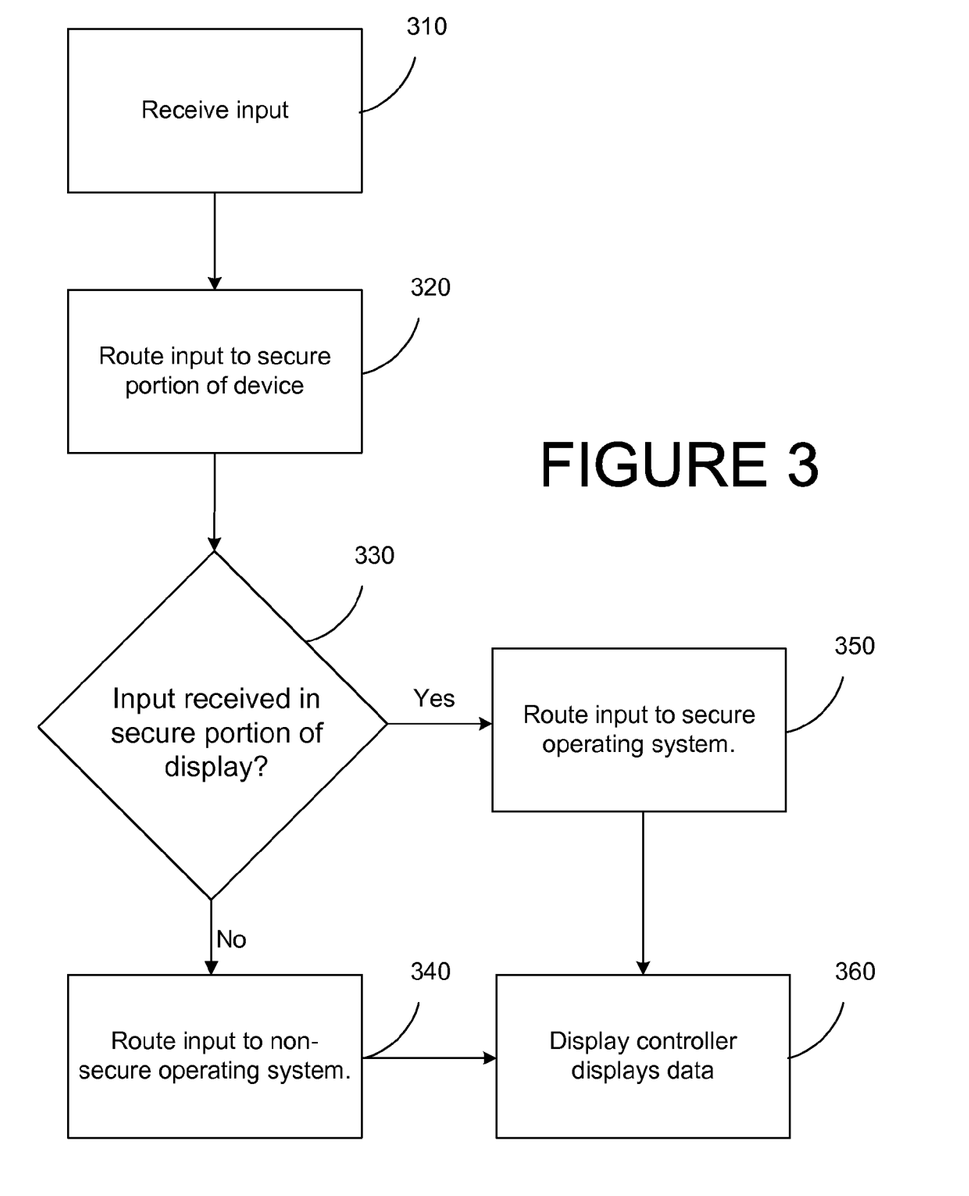
FIG. 3 is an illustration of an exemplary method 300 for receiving and processing inputs made to a display on a handheld communications device with integrated secure and non-secure components in accordance with the present invention.

FIG. 3 is an illustration of an exemplary method for receiving and processing inputs made to a display with integrated secure and non-secure components in accordance with the present invention. At 310, an input is received by the handheld communications device. The input may be received through a touch sensitive overlay on top of the display, for example.

At 320, received input is routed to a secure component of the handheld device. As illustrated in FIG. 2, the handheld communications device includes both a secure and non-secure component, with each component having its own CPU and operating system. In addition, each of the secure and non-secure components has a corresponding section of the display through which data is received and displayed by the corresponding component. In this way, a single handheld communications device is able to function as both a secure and non-secure device.

At 330, the secure component makes a determination if the input was made to the secure portion of the display. In order to ensure that no secure data is received by the non-secure component, determinations as to which component a received input is directed to is made within the secure component. The secure component may make the determination by comparing coordinates associated with the received input with stored coordinates of the secure display. If the received input is within the secure display, then the embodiment continues at 350. Else, the embodiment continues at 340.

At 340, the input is routed to the non-secure component of the handheld device. The input is received and processed by a non-secure operating system executing on the non-secure CPU. The non-secure operating system may comprise Windows CE®; however, any operating system capable of executing on a handheld communications device may be used.

At 350, the input is acted on by the secure component. As described above, a determination has been made that the data was directed to the secure component. Accordingly, the data is directed to a secure operating system executing on a secure CPU. Both the secure CPU and secure operating system are deemed to be secure by meeting some standard for security. The particular standards required of the operating system and CPU to meet may vary depending on the sensitivity of the data or the anticipated use for the handheld device.

At 360, output from the secure or non-secure CPUs is routed to the display controller. The display controller drives the attached display of the handheld communications device.

As described above, the display is bifurcated into a secure portion and a non-secure portion, with each display portion corresponding to the secure or non-secure component respectively. The display controller combines the received display output and sends it to the display for viewing.

Figure 4:
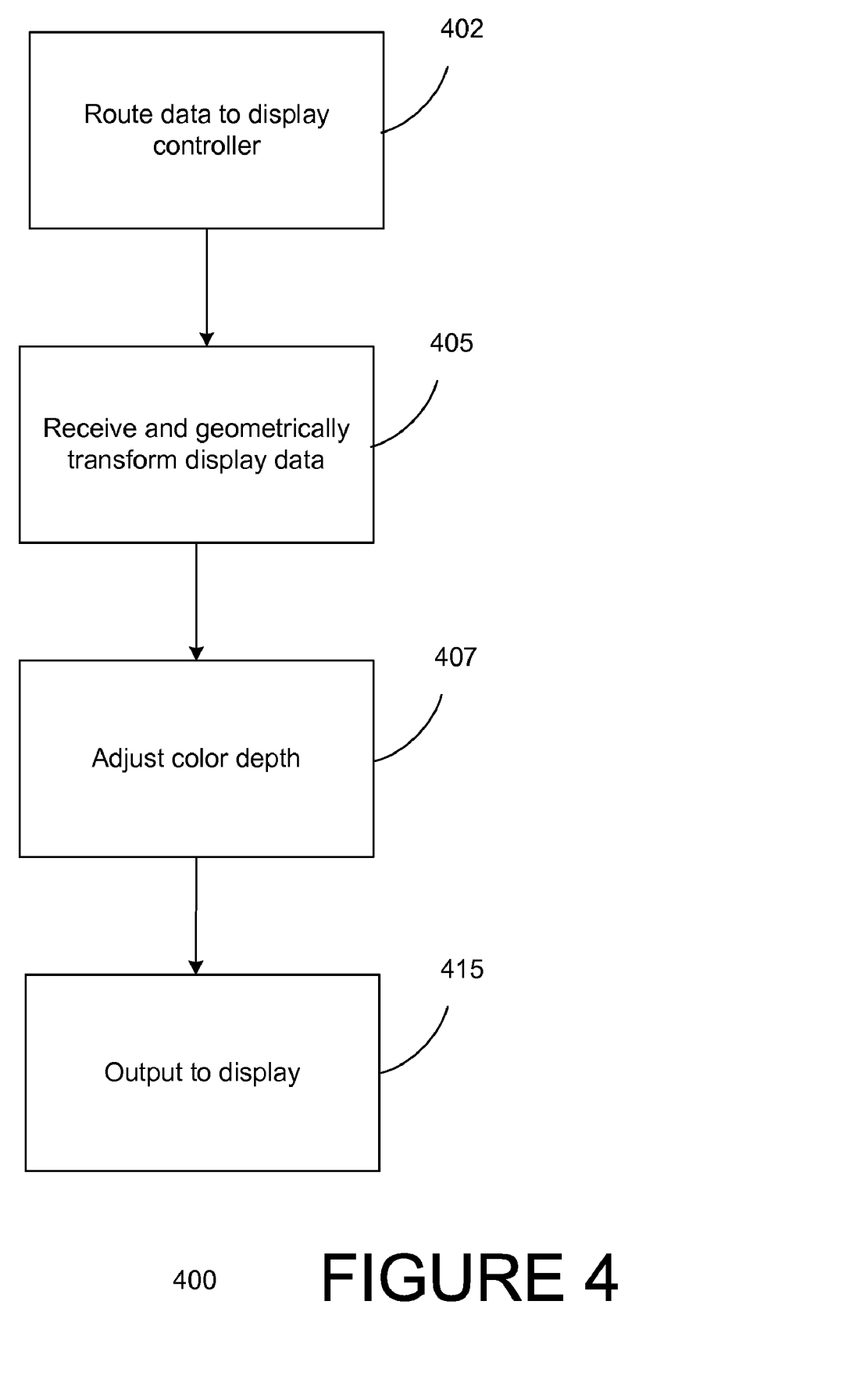
FIG. 4 is an illustration of an exemplary method 400 for the display of secure and non-secure data on a single display in accordance with the present invention.

FIG. 4 is a method for integrating data received from a secure component, and a non-secure component on a single display in accordance with the present invention. At 402, display data is routed from both the secure and non-secure components to a display controller. The display controller is adapted to receive the display data from the secure and non-secure components and display the data in their associated portion of the attached display.

At 405, the display data is received and refreshed to the display by the display controller. Each of the secure and non-secure components output display data unaware that they are sharing space on a single display. In one embodiment, the pixel data for the secure and non-secure display portions are retrieved from the respective secure and non-secure component memory by the display controller and used to refresh the appropriate portion of the display.

At 407, the color depth of the received display data may be adjusted in accordance with the particular requirements of the attached display. Because of the type of applications that are typically executed by the secure operating system, it may be desirable to use a lower color depth for the secure operating system than the depth used for the non-secure operating system to save system resources. However, the display utilized by the handheld communications device may not be able to display received data with non-uniform color depth.

In order to allow the secure operating system to operate at a lower color depth, the received lower color depth display data is first converted to the same color depth as the non-secure operating system before being output to the LCD display by the display controller.

In one embodiment the operating system of the secure component outputs display data at a color depth of 8-bit, while the non-secure operating system outputs data with a color depth of 16-bit. To increase the color depth of the secure component output, a lookup table is used by the display controller. The table comprises an entry for each 8-bit color along with a 16-bit equivalent. The 8-bit colors of the secure component output are then replaced with the 16-bit equivalents from the table, saving memory resources in the secure component 209.

At 415, the modified secure and non-secure output data are displayed on the display of the handheld communications device. Any system for interfacing the display controller with the display can be used.

Figure 5:
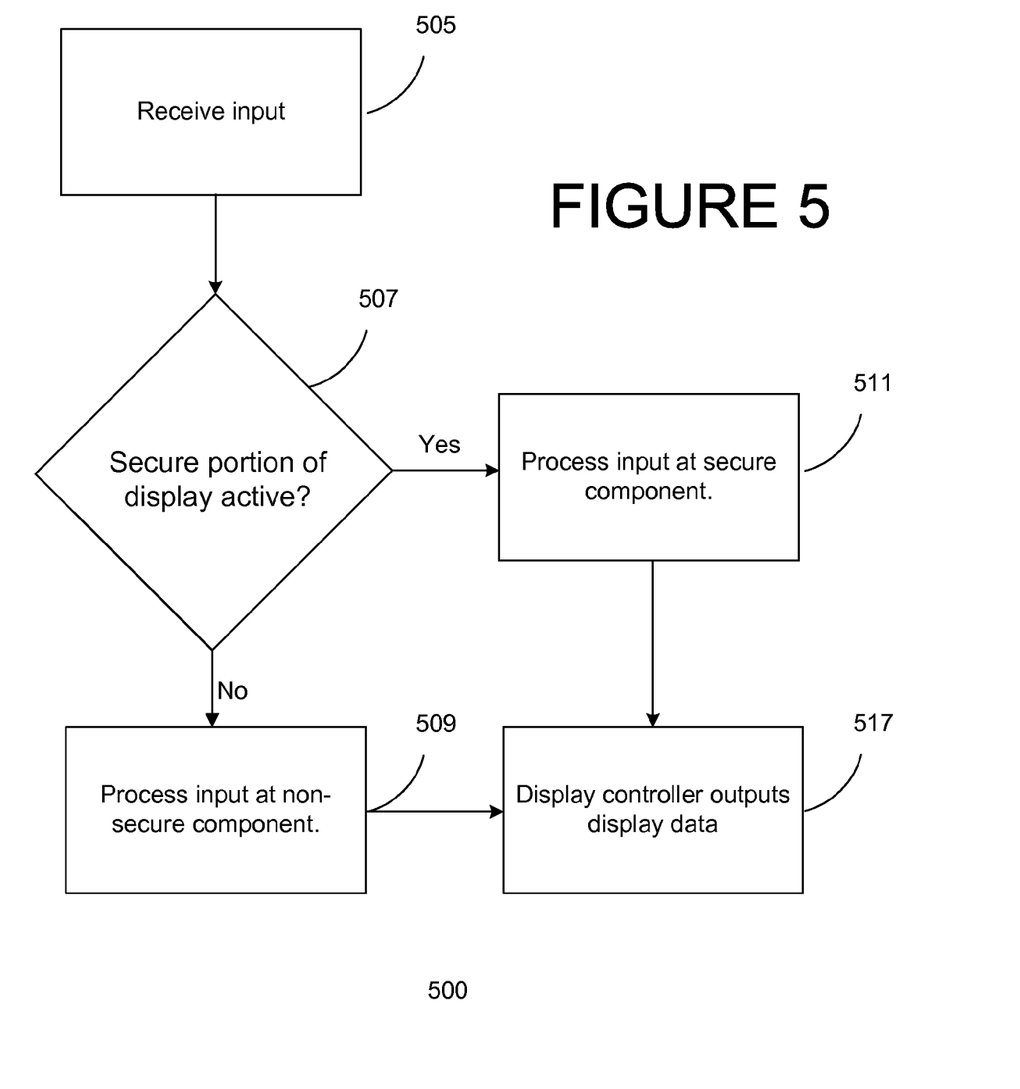
FIG. 5 is an illustration of an exemplary method 500 for receiving and processing inputs made to a keyboard in a handheld communications device with integrated secure and non-secure components in accordance with the present invention.

FIG. 5 is an illustration of a method 500 for processing input made to the Keyboard in accordance with the present invention. At 505, an input is received through the Keyboard 115. The input may have been directed to either the secure component 209 or the non-secure component 203.

At 507, the input is routed to the secure component 209 to determine which portion of the display 105 was active when the keyboard 115 input was received. The secure component 209 may determine which portion of the display was active by determining which portion of the display last received a user input. If the secure component 209 determines that the active portion of the display is the non-secure display portion 105a, then the keyboard input is routed from the secure component 209 to the non-secure component 203 at 509. If the secure component 209 determines that the active portion of the display is the secure display portion 105b, then the input is processed by the secure component 209 at 511.

At 509, the keyboard input is routed to the non-secure component of the handheld device. The input is received and processed by a non-secure operating system executing on the non-secure CPU.

At 511, the keyboard input is processed by the secure component 209. As described above, a determination has been made that the data was directed to the secure component 209. Accordingly, the data is directed to the secure operating system executing on the secure CPU.

At 517, any output from the secure or non-secure CPUs is routed to the display controller 207.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The various techniques described herein can be implemented in connection with hardware or software or, where appropriate, with a combination of both. Thus, the methods and apparatuses can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for seamlessly compressing and transferring information.

What is claimed:

1. A method for secure and non-secure operation of a handheld communications device, the method comprising:
   receiving an input to the handheld communications device via a touch screen display;
   forwarding coordinates of the input to a secure CPU;
   determining if the input was directed to the secure CPU, or to a non-secure CPU at the secure CPU, wherein the determining comprises determining if the coordinates of the input correspond to coordinates of a non-secure portion of the touch screen display or coordinates of a separate, concurrently present secure portion of the touch screen display;
   processing the received input at the secure CPU if it is determined that the input was received from the secure portion of the touch screen display;
   communicating the received input from the secure CPU to the non-secure CPU if it is determined that the input was received from the non-secure portion of the touch screen display;
   processing the received input at the non-secure CPU if it is determined that the input was received from the non-secure portion of the touch screen display; and
   displaying secure data generated by the secure CPU at the secure portion of the touch screen display and displaying non-secure data generated by the non-secure CPU at the non-secure portion of the touch screen display.

2. The method of claim 1, wherein determining if the input was directed to a secure CPU or a non-secure CPU comprises:
   determining that the input was directed to the secure CPU based on the coordinates of the input being within predetermined coordinates of the touch screen display that correspond to the secure portion of the touch screen display or determining that the input as was directed the non-secure CPU based on the coordinates of the input being within predetermined coordinates of the touch screen display that correspond to the non-secure portion of the touch screen display.

3. The method of claim 1, further comprising the secure CPU executing a secure operating system and the non-secure CPU executing a non-secure operating system.

4. The method of claim 1, further comprising:
receiving display data from the secure CPU and the non-secure CPU;
displaying the display data from the CPU in the secure portion of the touch screen display; and
displaying the display data from the non-secure CPU in the non-secure portion of the touch screen display.

5. The method of claim 4, wherein the display data received from the secure CPU has a lower color depth than the display data received from the non-secure CPU, and further comprising increasing the color depth of the display data received from the secure portion of the touch screen display to equal the color depth of the display data received from the non-secure portion of the touch screen display.

6. The method of claim 1, wherein the handheld communications device comprises a keyboard, the input is received through the keyboard, and determining if the input was directed to the secure CPU or the non-secure CPU comprises:
determining if the secure or the non-secure portion of the touch screen display was active when the input was received;
determining that the input was directed to the secure CPU if the secure portion was active; and
determining that the input was directed to the non-secure CPU if the non-secure portion was active.

7. A handheld communication device comprising:
a shared input and output interface comprising a touch screen display, the shared input and output interface being configured to receive an input via the touch screen display and to forward coordinates of the input to a secure CPU;
the secure CPU configured to execute and generate secure data and to determine if the input was directed to the secure CPU or a non-secure CPU based on whether the coordinates of the input correspond to coordinates of a non-secure portion of the touch screen display or to coordinates of a separate, concurrently present secure portion of the touch screen display, wherein the secure CPU is further configured to process the input if it is determined that the input was received from the secure portion of the touch screen and communicate the input to the non-secure CPU if it is determined that the input was received from the non-secure portion of the touch screen display;
the non-secure CPU configured to execute and generate non-secure data and process the input if it is determined that the input was received from the non-secure portion of the touch screen display; and
the shared input and output interface configured to receive and display secure and non-secure data, wherein the shared input and output interface comprises the touch screen display for displaying non-secure data from the non-secure CPU on the non-secure portion of the touch screen display and displaying secure data from the secure CPU on the concurrently present, separate secure portion of the touch screen display.

8. The handheld communications device of claim 7, wherein the shared input and output interface comprises:
a keyboard.

9. The handheld communication device of claim 7, wherein the secure CPU is configured to:
determine if received data is secure or non-secure;
execute the data if it is determined that the data is secure; and
route the data to the non-secure CPU if it is determined that the data is non-secure.

10. The handheld communication device of claim 7, wherein the touch screen display is a Liquid Crystal Display (LCD).

11. The handheld communication device of claim 10, wherein the secure display portion and the non-secure portion are separated.

12. A computer-readable device with computer-executable instructions stored thereon for performing the method of:
receiving an input to a handheld communications device via a touch screen display;
forwarding coordinates of the input to a secure CPU;
determining, at the secure CPU, if the input was directed to the secure CPU or a non-secure CPU, wherein the determining comprises determining if the coordinates of the input correspond to coordinates of a non-secure portion of a display or coordinates of a concurrently present, separate secure portion of the display;
processing the received input at the secure CPU if it is determined that the input was directed to the secure CPU;
communicating the received input from the secure CPU to the non-secure CPU if it is determined that the input was directed to the non-secure CPU;
processing the received input at the non-secure CPU if it is determined that the input was directed to the non-secure CPU; and
displaying secure data generated by the secure CPU to the secure portion of the touch screen display and displaying non-secure data generated by the non-secure CPU to the non-secure portion of the touch screen display.

13. The computer-readable device of claim 12, further comprising computer-executable instructions for:
storing, at the secure CPU, the coordinates of the non-secure portion of the touch screen display and the coordinates of the secure portion of the touch screen display; and
comparing the coordinates of the input to at least one of the coordinates of the non-secure portion of the touch screen display or the coordinates of the secure portion of the touch screen display.

14. The computer-readable device of claim 12, further comprising the secure CPU executing a secure operating system and the non-secure CPU executing a non-secure operating system.

15. The computer-readable device of claim 14, wherein the non-secure operating system is Windows CE.

16. The computer-readable device of claim 12, further comprising computer-executable instructions for:
receiving display data from the secure CPU and the non-secure CPU;
displaying the display data from the secure CPU in the secure portion of the touch screen display; and
displaying the display data from the non-secure CPU in the non-secure portion of the touch screen display.

17. The computer-readable device of claim 16, wherein the display data received from the secure CPU has a lower color depth than the display data received from the non-secure CPU, and further comprising computer-executable instructions for increasing the color depth of the display data received from the secure portion of the touch screen display to equal the color depth of the display data received from the non-secure portion of the touch screen display.

18. The computer-readable device of claim 12, wherein the handheld communications device comprises a keyboard and the display, the input was received through the keyboard, and determining if the input wad directed to a secure CPU or a non-secure CPU comprises computer-executable instructions for:
    determining if the secure or the non-secure portion of the touch screen display was active when the input was received;

determining that the input wad directed to the secure CPU if the secure portion was active; and
determining that the input wad directed to the non-secure CPU if the non-secure portion was active.

* * * * *